United States Patent [19]

Yamauchi et al.

[11] Patent Number: 5,745,202
[45] Date of Patent: Apr. 28, 1998

[54] LCD HAVING LIGHT INTERCEPTIVE MEMBERS FOR SHIELDING LIGHT FROM EXTERNAL DRIVING CIRCUITS

[75] Inventors: Masamichi Yamauchi, Tokyo; Yasuhiro Imai, Tokorozawa, both of Japan

[73] Assignee: Citizen Watch Co., Ltd., Tokyo, Japan

[21] Appl. No.: 727,479

[22] PCT Filed: Feb. 16, 1996

[86] PCT No.: PCT/JP96/00347

§ 371 Date: Oct. 16, 1996

§ 102(e) Date: Oct. 16, 1996

[87] PCT Pub. No.: WO96/25687

PCT Pub. Date: Aug. 22, 1996

[30] Foreign Application Priority Data

Feb. 17, 1995 [JP] Japan ................... 7-028535

[51] Int. Cl.⁶ ................... G02F 1/1333; G02F 1/1345
[52] U.S. Cl. ................... 349/110; 349/149; 349/151
[58] Field of Search ................... 349/110, 149, 349/150, 151

[56] References Cited

U.S. PATENT DOCUMENTS 4,643,526  2/1987  Watanabe et al. ............ 349/151
5,130,832  7/1992  Kawaguchi et al. ........... 349/149
5,574,292  11/1996 Takahashi et al. ............ 349/42

FOREIGN PATENT DOCUMENTS

0 267 688  5/1988  European Pat. Off. ......... 349/149
2-142819  12/1990  Japan.
4-88319   3/1992   Japan.
6-110057  4/1994   Japan.
6-43626   6/1994   Japan.

*Primary Examiner*—William L. Sikes
*Assistant Examiner*—Toan Ton
*Attorney, Agent, or Firm*—Finnegan, Henderson, Farabow, Garrett & Dunner

[57] ABSTRACT

According to the present invention, in a liquid-crystal display device, at least two transparent glass substrates each having transparent electrodes formed thereon are arranged so that the transparent electrodes formed on the substrates are opposed to each other with a space between them, a liquid crystal is injected into the space, and a seal is fitted into the space for fear the liquid crystal should leak out. A first light interceptive member having a light absorptive member for absorbing light is placed on the transparent glass substrates below the drive circuits (FIG. 2).

15 Claims, 8 Drawing Sheets

| DISTANCE | 40cm | 30cm | 25cm | 20cm | 15cm |
|---|---|---|---|---|---|
| SAMPLE A | OK | OK | OK | OK | NG |
| SAMPLE B | OK | OK | NG | | |
| SAMPLE C | OK | NG | | | |

Fig.10(B)

| DISTANCE | 40cm | 30cm | 25cm | 20cm | 15cm |
|---|---|---|---|---|---|
| SAMPLE A | OK | OK | OK | NG | |
| SAMPLE B | OK | OK | OK | NG | |
| SAMPLE C | OK | NG | | | |

Fig.10(C)

| DISTANCE | 40cm | 30cm | 25cm | 20cm | 15cm |
|---|---|---|---|---|---|
| SAME SIZE AS IC | OK | OK | NG | | |
| LARGER BY 0.5 mm THAN IC | OK | OK | OK | OK | NG |
| LARGER BY 1.0 mm THAN IC | OK | OK | OK | OK | NG |

Fig.10(D)

| DISTANCE | 40cm | 30cm | 25cm | 20cm | 15cm |
|---|---|---|---|---|---|
| SAME SIZE AS IC | OK | NG | | | |
| LARGER BY 0.5 mm THAN IC | OK | OK | OK | NG | |
| LARGER BY 0.7 mm THAN IC | OK | OK | OK | OK | NG |
| LARGER BY 1.0 mm THAN IC | OK | OK | OK | OK | NG |

LCD HAVING LIGHT INTERCEPTIVE MEMBERS FOR SHIELDING LIGHT FROM EXTERNAL DRIVING CIRCUITS

TECHNICAL FIELD

The present invention relates to a liquid-crystal display device employed in a liquid-crystal television, liquid-crystal monitor, liquid-crystal projector, or the like. More particularly, this invention is concerned with a liquid-crystal display device in which it is prevented that ICs serving as drive circuits for driving the liquid-crystal display device malfunction due to light.

BACKGROUND ART

In recent years, liquid-crystal display devices have been employed in many fields such as the fields of televisions, clocks, and portable telephones. In general, a system for driving a liquid-crystal display device includes a static driving system in which all segment electrodes are driven mutually independently and a multiplex driving system in which all segment electrodes are divided into a plurality of groups and driven in time-sharing. In either of the driving systems, drive circuits are provided in the form of ICs and located very close to the liquid-crystal display device. The drive circuit is, in principle, composed of selection circuits for selecting columns and rows of elements set in array in the form of a matrix, a scanning circuit for scanning these elements, and a holding circuit for temporarily storing data. These circuits are provided in the form of ICs in an effort to design them more compactly. However, as a circuit is getting finer, it becomes more susceptible to light.

By the way, inevitable light emanating from the liquid-crystal display device, that is, light traveling inside the display device itself and light emanating from a backlight fall on the drive circuit.

However, since the liquid-crystal display device is, as mentioned above, employed in quite a few fields, it may pose a problem in practice. For example, when a strobe of a camera is flashed immediately above the liquid-crystal display device or an IC serving as a drive circuit is actuated under a light or under sunlight, a problem occurs. This kind of situation is encountered daily. Measures therefore must be taken for fear the liquid-crystal display device should malfunction because of extraneous light.

DISCLOSURE OF THE INVENTION

An object of the present invention is to provide a liquid-crystal display device in which it is prevented that ICs serving as drive circuits and lying very close to the liquid-crystal display device malfunction because of extraneous light or internal traveling light, and thus display quality is improved.

According to the present invention, a liquid-crystal display device, in which at least two transparent glass substrates each having transparent electrodes formed thereon are arranged so that the transparent electrodes formed on the substrates are opposed to each other with a space between them, a liquid crystal is injected into the space, a seal is fitted into the space for fear the liquid crystal should leak out, and ICs for driving the liquid crystal are placed on the substrates outside the seal, is characterized in that a first light interceptive member having a light absorptive member for absorbing light is placed on the transparent substrates below the ICs.

A preferred embodiment is characterized in that a second light interceptive member having a light reflective member for reflecting light as one side thereof and having a light absorptive member for absorbing light as the other side thereof is placed on the transparent glass substrates below the ICs.

In another preferred embodiment, a light absorptive member is made of black nonwoven fabric or black polyester cloth. Moreover, a viscous material is coated over the face of the light absorptive member.

Furthermore, the viscous material is a rubber material, silicon material, or resin material. Moreover, a light reflective member is made of aluminum foil.

Yet another preferred embodiment further comprises a third light interceptive member for covering the ICs and their surroundings. The third light interceptive member is made of silicon resin or the same material as the first or second light interceptive member.

Furthermore, a fourth light interceptive member is placed to lie around ICs and abut on a frame having a display window and a transparent glass substrate on which the ICs are mounted. The fourth light interceptive member is made of an elastic material such as sponge or rubber.

Furthermore, a fifth light interceptive member is placed to abut on the lateral side of an IC, a transparent glass substrate, and a frame having a display window. The fifth light interceptive member is made of an elastic material such as sponge or rubber.

Furthermore, a sixth light interceptive member is placed to abut on an edge of the first or second light interceptive member, a transparent glass substrate, and a frame having a display window. The sixth light interceptive member is made of an elastic material such as sponge or rubber.

BEST MODE FOR CARRYING OUT THE INVENTION

Prior to description of the best mode for carrying out the invention, a prior art and its underlying problems will be described below.

Figure 11:
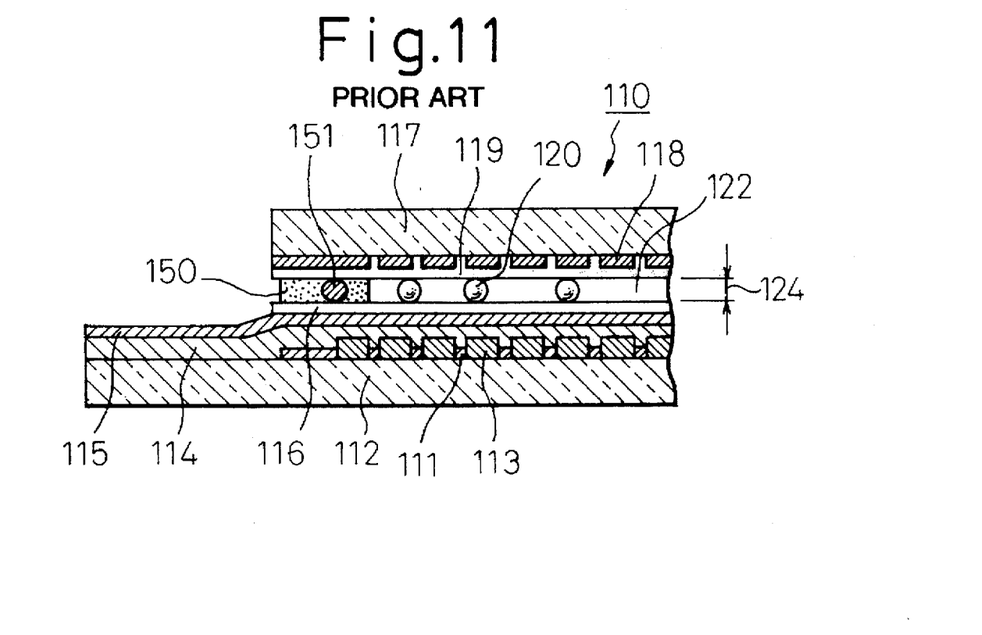
FIG. 11 is a sectional view of the structure of part of a known typical color liquid-crystal display device.

FIG. 11 is a sectional view of the structure of part of a typical color liquid-crystal display device of a prior art. A known liquid-crystal display device 110 will be described below.

In FIG. 11, light interceptive membranes 111 and color filters 113 are formed on the face of a glass substrate 112 that is one transparent substrate, and a protective membrane 114 is formed over the color filters 113. Pixel electrodes 115 that are transparent conductive membranes are formed on the protective membrane 114. Moreover, an alignment layer 116 for aligning the molecules of a liquid crystal is formed over the pixel electrodes 115. On the face of the other glass substrate 117, pixel electrodes 118 realized with transparent conductive membranes are formed. An alignment layer 119 is formed over the pixel electrodes 118. Both the substrates are affixed to each other with a seal 150. The thickness of a liquid crystal 122 (a distance between the opposed alignment membranes or a space 124 in the liquid-crystal display device 110) is defined mainly by intra-liquid crystal spacers 120. The intra-liquid crystal spacers 120 are distributed substantially uniformly over one substrate before both the substrates are affixed to each other.

The pixel electrodes 115 are extended outside the seal 150 as line connection electrodes for use in driving the liquid crystal. An intra-seal spacer 151 is contained in the seal 150. The intra-seal spacer 151 as well as the intra-liquid crystal spacers 120 determine the size of the space 124 in the liquid-crystal display device 110.

The protective member 114 is intended to protect the color filters 113 and flatten the faces of the color filters 113 and light interceptive membranes 111.

A known liquid-crystal display device includes, as described in, for example, Japanese Unexamined Utility Model Publication No. 6-8936, a liquid-crystal display device in which ICs serving as drive circuits for driving a liquid crystal are placed on transparent glass substrates. A method of placing ICs on transparent glass substrates includes a method referred to as chip-on-glass (COG) method in which, as described in, for example, Japanese Unexamined Utility Model Publication No. 6-8936, Japanese Unexamined Patent Publication No. 6-112272, and Japanese Unexamined Utility Model Publication No. 1-87551, ICs (drive circuit chips) are mounted on transparent glass substrates, and a method in which thin-film transistors (TFTs) that have been commercialized and described in Japanese Unexamined Patent Publication No. 6-130417 are used to form logical elements and eventually form a drive circuit.

The present invention can apply to either of the foregoing methods of mounting liquid-crystal drive circuits. The present invention gains an especially outstanding advantage when it applies to the CGO method. A prior art applying to the COG method will therefore be described as a prior art below.

Figure 12:
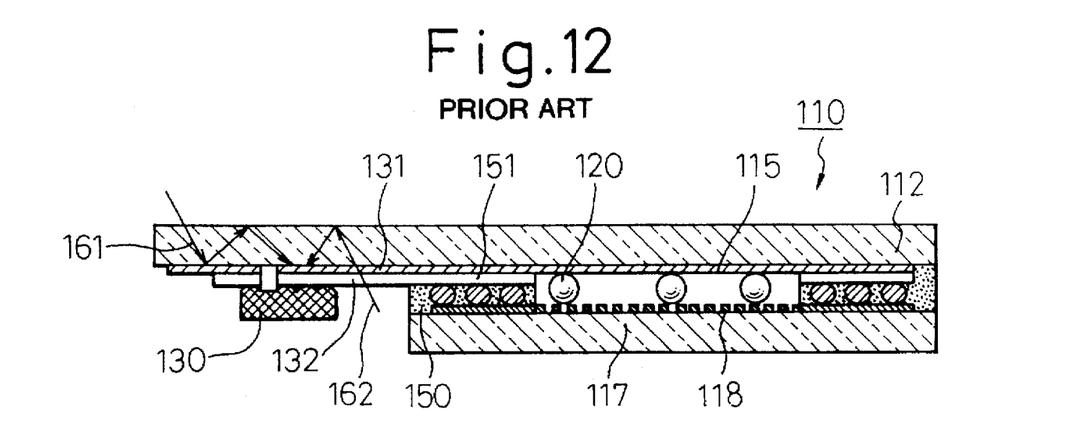
FIG. 12 is a sectional view of a known COG liquid-crystal display device.

FIG. 12 is a sectional view of a known COG liquid-crystal display device. In FIG. 12, pixel electrodes 115 are formed on a transparent substrate 112 made of a glass material. A substrate made of a plastic material may be used as the transparent substrate. Lead electrodes 131 used to connect a drive circuit to the pixel electrodes are formed on the glass substrate 112. An IC 130 serving as a drive circuit is connected to the ends of the lead electrodes 131. Lead electrodes through which a signal is input or output from or to a liquid-crystal display are extending from the other terminal of the IC 130 linked to the lead electrodes 131, though the lead electrodes are not shown. Through the input/output lead electrodes, the IC 130 is connected to an external circuit of the liquid-crystal display device by means of conductive adhesion or a connector.

A glass substrate 117 has the same structure as the glass substrate 112. Lead electrodes for linking ICs to pixel electrodes 116 are formed on the glass substrate 117. ICs serving as drive circuits are linked to the ends of the lead electrodes. The lead electrodes and ICs are located at a deep end in the drawing and are therefore not shown.

The substrates 112 and 117 having the foregoing structure are opposed to each other with a certain space defined between them by intra-liquid crystal spacers 120 and intra-seal spacers 151. Furthermore, a seal 150 is fitted into the space substantially along the margins of the substrates for the purpose of sealing. A liquid crystal is injected into the space, and an injection port is sealed. Thus, the liquid-crystal display device 110 is constructed.

A conducting layer 132 is intended to reinforce the lead electrodes 131 or lower resistances. Whether or not to include the conducting layer 132 can be determined arbitrarily in terms of various requirements.

In the prior art, there is a problem that when extraneous light or internal traveling light falls on an IC serving as a drive circuit, the IC malfunctions because the polarities of bits inside the IC are reversed, and, as a result, display quality deteriorates.

A cause of malfunction of an IC has been investigated carefully. It has been revealed that light 161 or 162 travels inside a transparent glass substrate, reaches around a bump (junction with lead electrodes) of an IC, and falls on the IC to cause the IC to malfunction.

In other words, generally, a lighting unit formed with a fluorescent tube, photoconductive member, LED, EL, or high-luminance lamp is located below a liquid-crystal panel. This poses a problem that various kinds of light emanating from the lighting unit or a lighting unit around a display device fall on an IC to cause the IC to malfunction because the polarities of bits in a memory or the like in the IC are reversed, and that display quality of a liquid-crystal display device deteriorates eventually.

An object of the present invention is to provide a liquid-crystal display device in which a cause of malfunction of ICs, that is, extraneous light or internal traveling light is eliminated in order to improve display quality.

Figure 1:
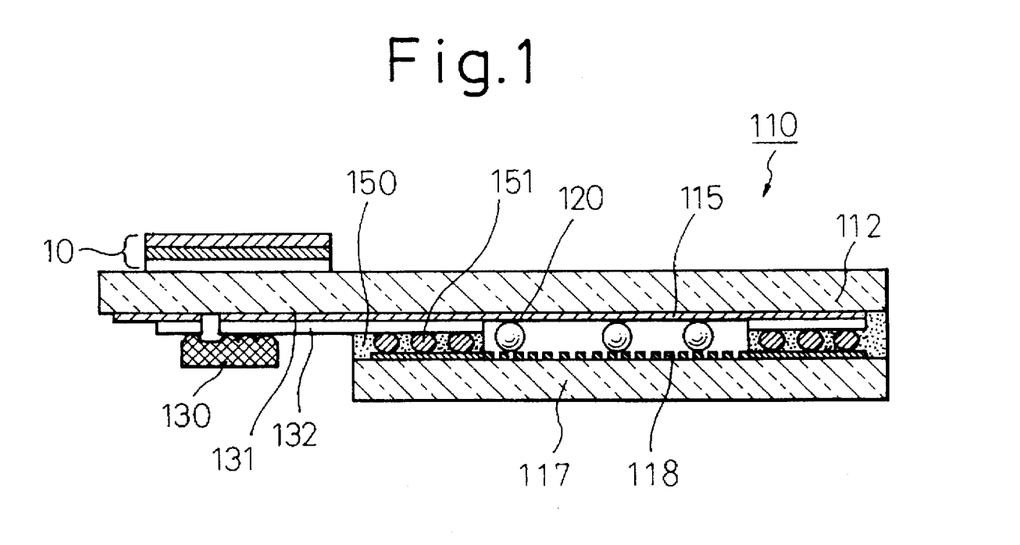
FIG. 1 is a sectional view of a liquid-crystal display device of the first embodiment of the present invention.
Figure 2:
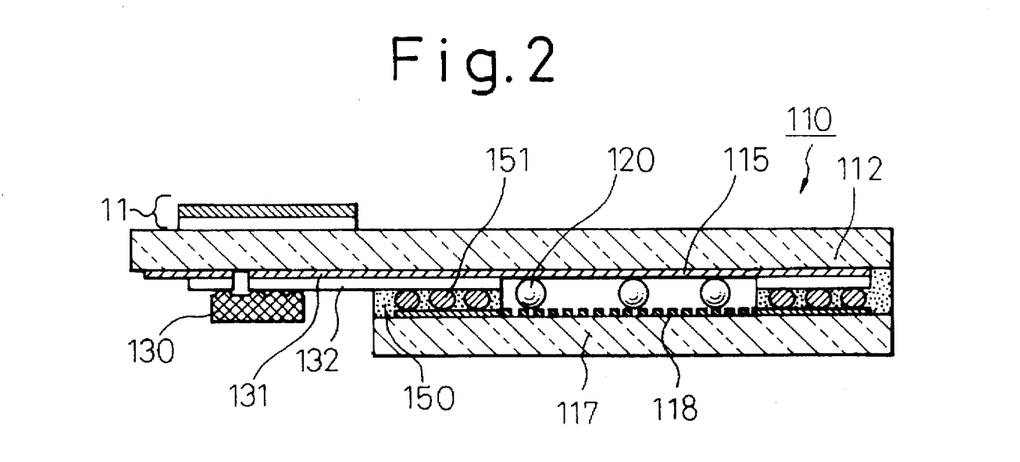
FIG. 2 is a sectional view of a liquid-crystal display device of the second embodiment of the present invention.
Figure 3:
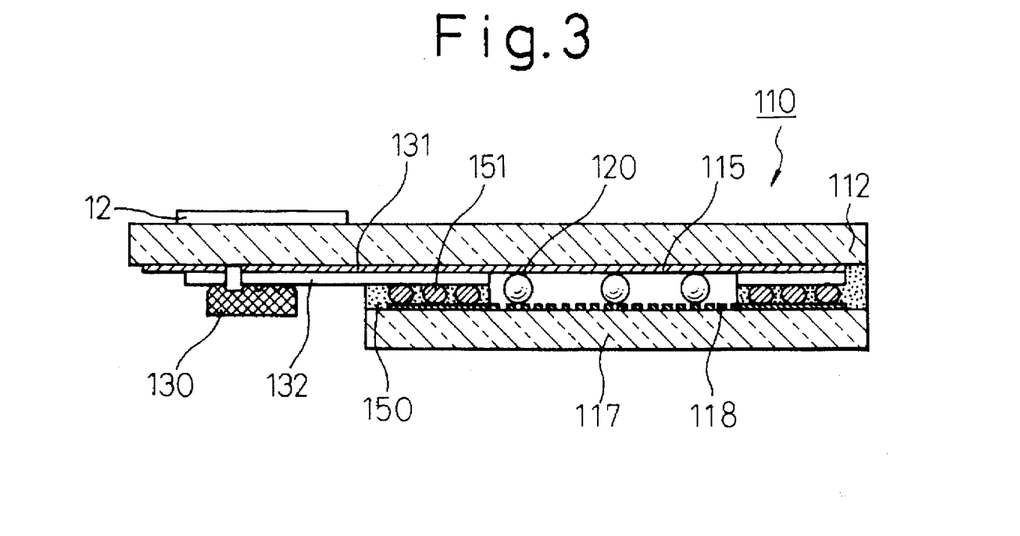
FIG. 3 is a sectional view of a liquid-crystal display device of the third embodiment of the present invention.

FIG. 1 is a sectional view of a liquid-crystal display device of the first embodiment of the present invention, FIG. 2 is a sectional view of a liquid-crystal display device of the second embodiment of the present invention, and FIG. 3 is a sectional view of a liquid-crystal display device of the third embodiment of the present invention.

In the description below, a light absorptive member itself shall be regarded as a first light interceptive member, and a combination of a light absorptive member and light reflective member is regarded as a second light interceptive member. Components identical to those in the prior art will be assigned the same reference numerals.

In FIG. 1 showing the first embodiment of the present invention, pixel electrodes 115 are formed on a substrate 112 that is a transparent substrate made of glass or a plastic material. Lead electrodes 131 for linking an IC to the pixel electrodes are also formed on the substrate 112. An IC 130 serving as a drive circuit is linked to ends of the lead electrodes 131. Lead electrodes through which a signal is input or output from or to a liquid-crystal display is extending from the other terminal of the IC linked to the lead electrodes 131, though the lead electrodes are not shown. Through the input/output lead electrodes, the IC is connected to an external circuit of the liquid-crystal display device 110 by means of conductive adhesion or a connector.

A substrate 117 has the same structure as the substrate 112. Lead electrodes 141 for linking ICs to pixel electrodes 118 are formed on the substrate 117. ICs 140 serving as drive circuits are linked to ends of the lead electrodes 141 (See FIG. 4).

The substrates 112 and 117 having the foregoing structure are opposed to each other with a certain space defined between them by intra-liquid crystal spacers 120 and intra-seal spacers 151. A seal 150 is fitted to the space substantially along the margins of the substrates for the purpose of sealing. A liquid crystal is injected into the space, and an injection port is sealed. Thus, the liquid-crystal display device is constructed.

A conducting layer-132 is intended to reinforce the lead electrodes 131 or lower resistances. Whether or not to include the conducting layer may be determined arbitrarily in terms of various requirements.

In FIG. 1, a second light interceptive member 10 is placed on a substrate side of the substrate 112 opposite to the IC 130. The light interceptive member 10 is realized by laminating a viscous material, black polyester (light absorptive member), aluminum foil (light reflection member) in that order from the substrate side. However, in practice, these members are united as a laminated sheet. This contributes to improvement of workability. That is to say, the members are united as light interceptive tape having a given width. The tape is cut to have a given length, and then placed on the substrate side of the substrate 112 opposite to the IC 130.

According to the structure shown in FIG. 1, light traveling a transparent glass substrate (light 161 and 162 in FIG. 12) is absorbed by the light absorptive member made of black polyester. Thus, invasion of light into the IC 130 through the substrate side can be prevented. By the way, extraneous light of the IC 130 is fully reflected by the aluminum foil made into the top layer of the light interceptive member 10. Thus, invasion of the light into the perimeter of the bump of the IC is hindered.

A resin, rubber, or silicon material can be used as the viscous material to be made into one layer of the light interceptive member 10.

Instead of the black polyester to be made into the light absorptive member, soft vinyl, polyethylene, glass, paper, or the like can be used in the form of film, nonwoven fabric, or cloth.

By the way, the material of the light reflective member may be any white or silver material other than the foregoing aluminum foil. Moreover, a thin plate that is aluminum-deposited in order to exert a sealing effect or a thin plate of a steel product will do.

The light interceptive member is very thin or ranges from 0.1 mm to 0.5 mm in thickness, and is therefore suitable for a liquid-crystal display device for which a thin design is requested.

In FIG. 2 showing the second embodiment of the present invention, a first light interceptive member 11 formed with a light absorptive member is placed on the substrate side of the substrate 112 opposite to the IC 130. The light interceptive member 11 is realized by laminating a viscous material and black polyester (light absorptive member) in that order from the substrate side. In practice, they are laminated as one sheet in order to improve workability.

According to the structure shown in FIG. 2, light traveling a transparent substrate is absorbed by black polyester made into the light absorptive member. Thus, invasion of light into the IC 130 through the glass substrate 112 can be hindered.

In FIG. 3 showing the third embodiment of the present invention, a first light interceptive member 12 (light absorptive member) is placed on a substrate side of the substrate 112 opposite to the IC 130. The light interceptive member 12 is made of a black light absorptive paint to be applied to the substrate side of the substrate 112, and realized by applying a mat paint, poster color, or black resin to the substrate.

According to the structure shown in FIG. 3, light traveling the transparent glass substrate is absorbed by the light absorptive member. Thus, invasion of light into the IC 130 through the substrate side can be hindered.

In the aforesaid embodiments of the present invention, the light interceptive member 10 (11, 12) is placed on a side of the glass substrate 112 opposite to the IC 130. As described in conjunction with FIG. 5 and thereafter, when an analogous light interceptive member is use in combination with the aforesaid light interceptive member located below the IC 130 and placed over the IC 130, the operation of the IC can be further stabilized.

Figure 4:
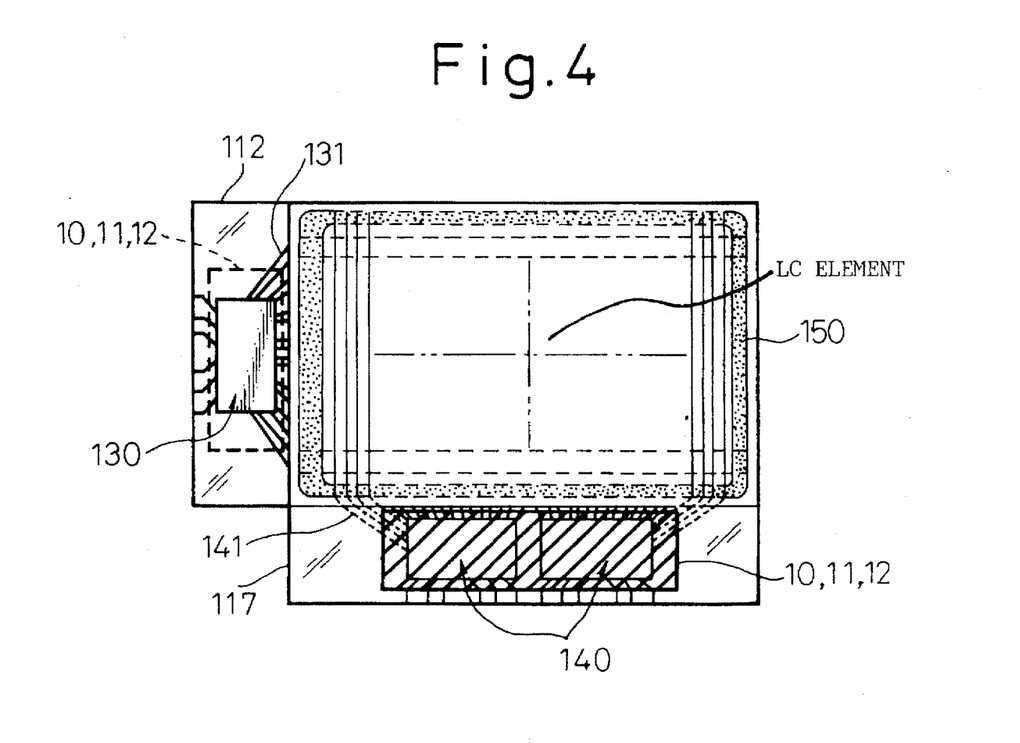
FIG. 4 is an explanatory diagram showing a state in which a first or second light interceptive member of the present invention is actually adapted to ICs located around a liquid-crystal display device.

FIG. 4 is a front view showing ICs to which the first or second light interceptive member of the present invention is adapted actually. As illustrated, as for the IC 130, the light interceptive member 10 (11, 12) is located behind the IC 130 as indicated with a dashed line. As for the ICs 140, the light interceptive member 10 (11, 12) is placed over the faces of the ICs as indicated with solid lines. Reference numerals 112 and 117 denote glass substrates. Defined with a thin line is a liquid-crystal display device.

Figure 5:
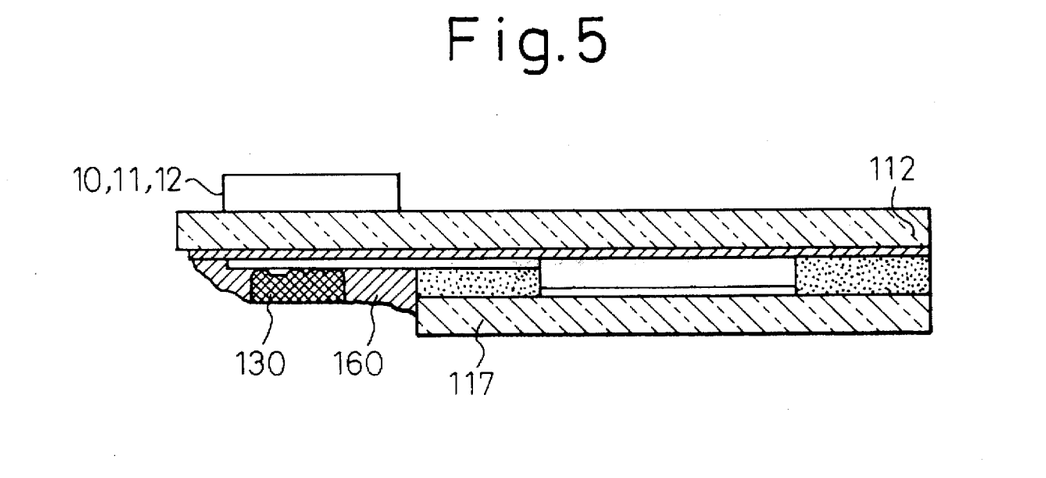
FIG. 5 shows the fourth embodiment of the present invention.

FIG. 5 shows the fourth embodiment of the present invention. An IC is covered with a third light interceptive member made of, for example, silicon resin, whereby it is prevented that extraneous light is reflected from the face of a glass substrate and falls on an IC element side or the side of a bump of the IC. As illustrated, the first or second light interceptive member 10 (11, 12) is placed on the glass substrate 112. The IC 130 is covered with the third light interceptive member made of silicon resin 160. The silicon resin 160 is tinted with a color absorbing or reflecting light. For example, a black pigment or black powder particles are mixed in silicon resin.

Figure 6:
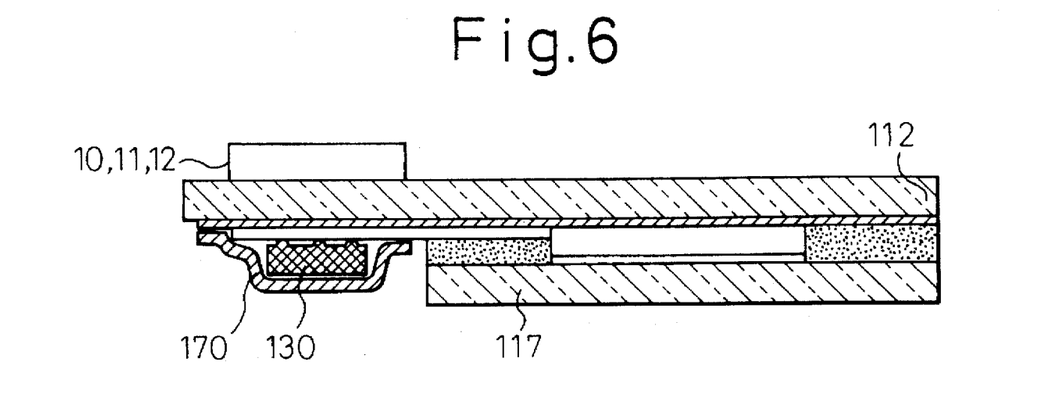
FIG. 6 shows the fifth embodiment of the present invention.

FIG. 6 shows the fifth embodiment of the present invention. In the embodiment shown in FIG. 5, an IC is covered with silicon resin. In this embodiment, a light interceptive tape 170 (equivalent to the light interceptive member 10, 11, or 12) employed in the embodiments shown in FIGS. 1 to 3 is placed over an IC.

Figure 7A:
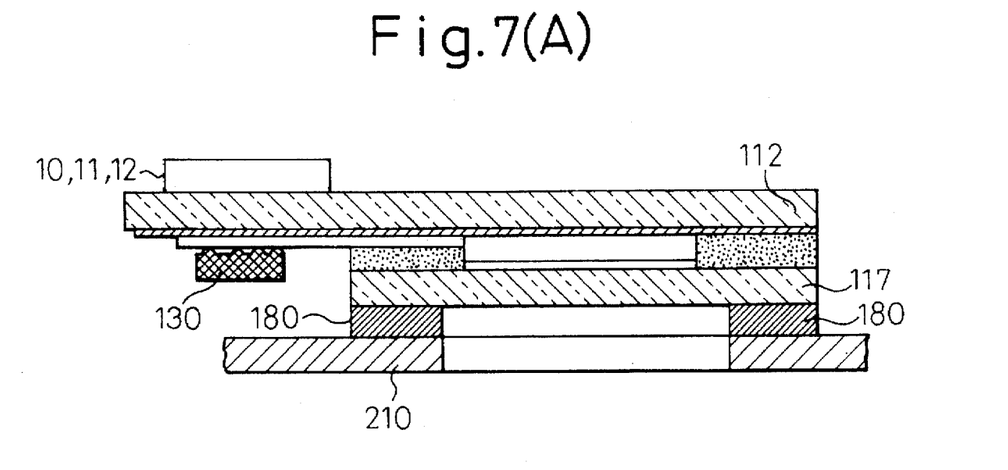
FIG. 7A shows the sixth embodiment of the present invention.
Figure 7B:
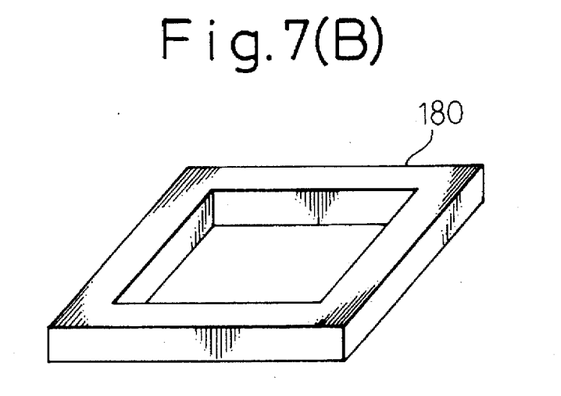
FIG. 7B shows the detailed structure of a light interceptive member shown in FIG. 7A.

FIG. 7A shows the sixth embodiment of the present invention, and FIG. 7B shows the detailed structure of a light interceptive member shown in FIG. 7A. In this embodiment, a fourth light interceptive member 180 made of sponge, rubber, or the like is interposed between the glass substrate 117 and a frame 210. Owing to this structure, light (arrow) coming from outside the frame 210 to the IC 130 can be blocked. As shown in FIG. 7B, the light interceptive member 180 is constructed by molding sponge or rubber tinted with a light absorptive color as one united body shaped like a frame.

Figure 8A:
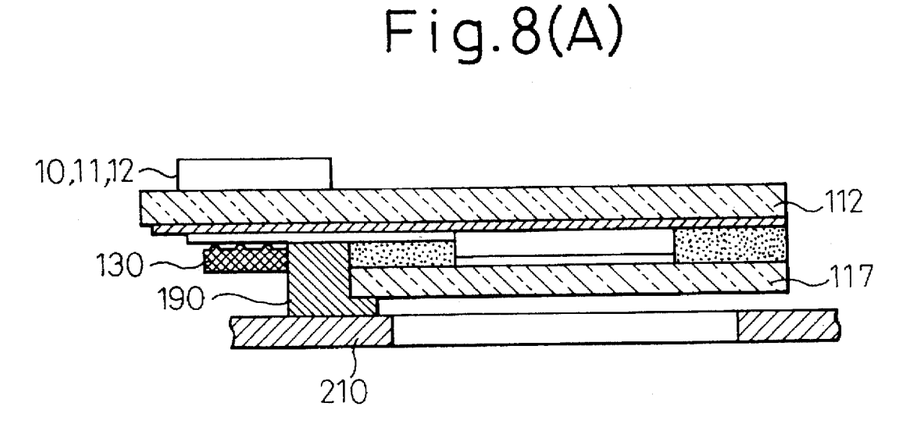
FIG. 8A shows the seventh embodiment of the present invention.
Figure 8B:
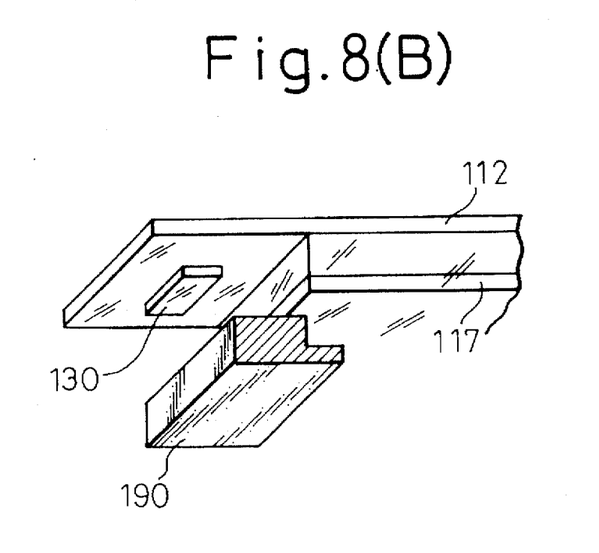
FIG. 8B shows the detailed structure of a light interceptive member shown in FIG. 8A.

FIG. 8A shows the seventh embodiment of the present invention, and FIG. 8B shows the detailed structure of a light interceptive member. A fifth light interceptive member 190 made of sponge or rubber is placed by the side of an IC. As illustrated, the fifth light interceptive member 190 is placed to abut on the IC 130, glass substrate 117, and frame 210.

Figure 9:
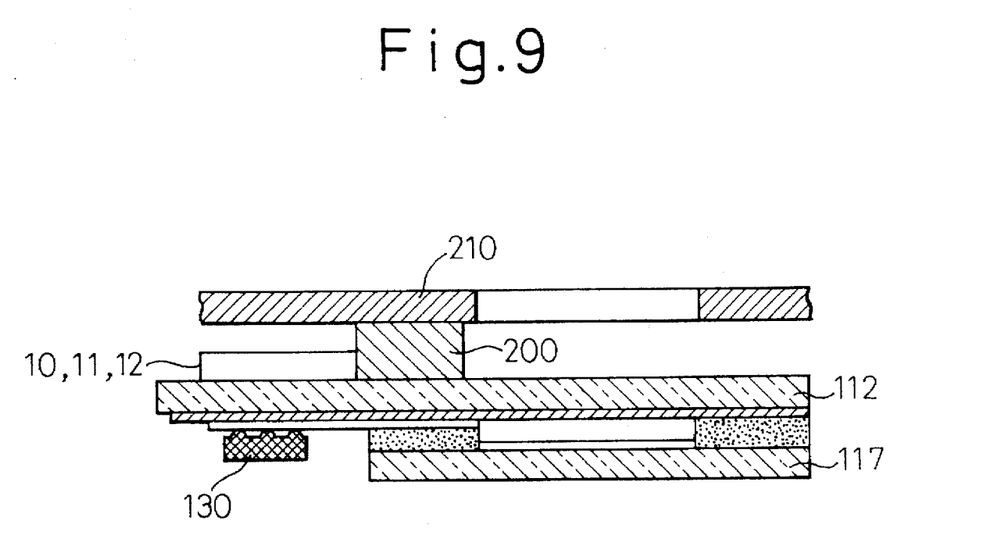
FIG. 9 shows the ninth embodiment of the present invention.

FIG. 9 shows the eighth embodiment of the present invention. In this embodiment, a sixth light interceptive member 200 made of sponge or rubber is placed by the side of the first or second light interceptive member 10 (11, 12). As illustrated, the sixth light interceptive member 200 is placed to abut on a lateral side of the first or second light interceptive member 10 (11, 12) and frame 210. Owing to this structure, extraneous light falling on an IC can be blocked.

Figure 10A:
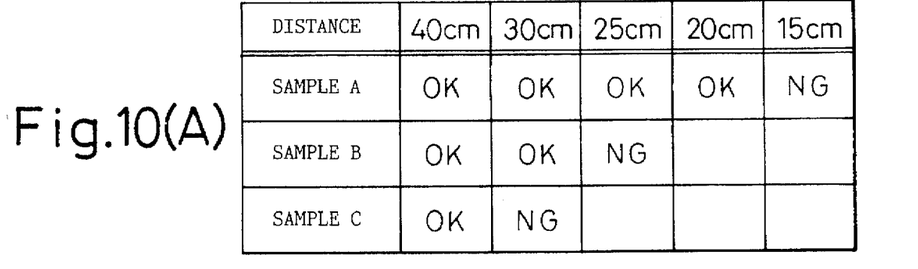
FIGS. 10A to 10D are explanatory diagrams concerning the advantage of the present invention.
Figure 10B:
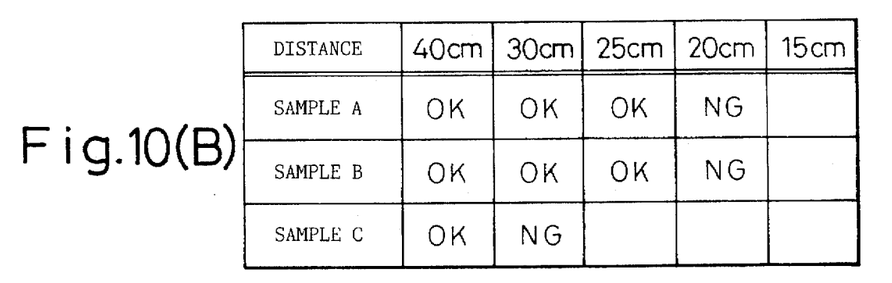

FIGS. 10A to 10B are explanatory diagrams concerning the advantage of the present invention, or especially, the advantages of the embodiments of the present invention shown in FIGS. 1 to 4. An experiment was conducted to judge whether the display on the display side of a liquid-crystal panel was normal (OK) or abnormal (NG) when the strobe of a camera was flashed above the display side of the liquid-crystal panel. At that time, the distance from the display side of the liquid-crystal panel to the strobe was varied, and the angle with respect to the strobe was also varied. Furthermore, the advantages of the embodiments were also judged by varying the size of a light interceptive tape. Samples employed in this experiment are as follows:

- sample A having a light interceptive tape whose top is aluminum-deposited, whose bottom is colored in black, and whose thickness is 50 micrometers;

- sample B having a black light interceptive tape whose thickness is 50 micrometers; and

- sample C having no light interceptive tape. Sample A is a liquid-crystal display device of the present invention having a light interceptive tape comparable to the second light interceptive member, sample B is a liquid-crystal display device of the present invention having a light interceptive tape comparable to the first light interceptive member, and sample C is a liquid-crystal display device of a prior art having no light interceptive tape.

A table shown in FIG. 10A lists the results of a test that was conducted under the condition that the strobe of a camera was flashed immediately above the display side of a liquid-crystal panel. The distance from the display side thereof to the strobe was varied to be 40, 30, 25, 20, and 15 cm. In the table, "OK" means that ICs operated normally and no abnormality appeared in liquid-crystal display. "NG" means that the ICs malfunctioned and abnormality appeared in liquid-crystal display. As listed in the drawing, sample A of the present invention experienced NG when the strobe was approached to a position 15 cm away from sample A. Sample B experienced NG when the distance to the strobe was 25 cm. Sample C of the prior art having no light interceptive tape experienced NG when the distance to the strobe was 30 cm.

A table in FIG. 10B lists the results of a test that was conducted under the condition that the strobe was flashed at an angle 45% with respect to the display side of a liquid-crystal panel. Incidentally, the distance to the strobe from the display side of the liquid-crystal panel was varied in the same manner as the test whose results are listed in the table of FIG. 10A. As listed in the table shown in FIG. 10B, samples A and B of the present invention experienced NG when the distance to the strobe was 20 cm. No difference was observed between these samples. However, sample C of the prior art experienced NG when the distance to the strobe was 30 cm.

Figure 10C:
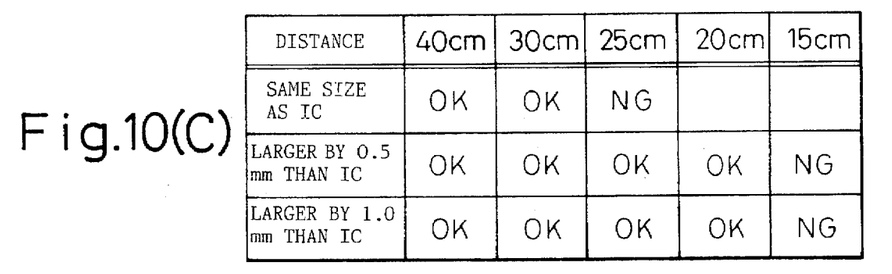
Figure 10D:
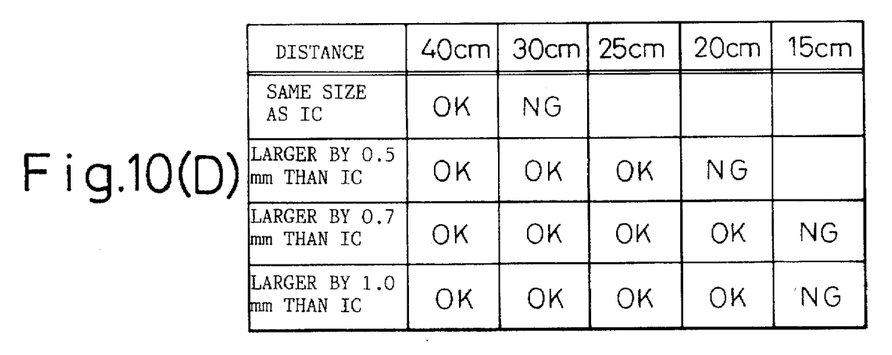

Tables in FIGS. 10C and 10D list the results of tests that were conducted by varying the size of a light interceptive tape. The table in FIG. 10C lists the results of the test that was conducted under the condition that the strobe of a camera was flashed immediately above the display side of a liquid-crystal panel. The table in FIG. 10D lists the results of the test that was conducted under the condition that the strobe was flashed at an angle 450 with respect to the display side of a liquid-crystal panel.

According to the results listed in the table shown in FIG. 10C, when the light interceptive tape has the same size as each IC, NG is judged with the distance to the strobe set to 25 cm. When the light interceptive tape is larger by 0.5 mm or more than each IC, NG is judged with the distance to the strobe set to 15 cm. According to the results listed in the table shown in FIG. 10D, when the light interceptive tape is larger by 0.7 mm or more than each IC, NG is judged with the distance to the strobe set to 15 cm. These results demonstrate that when the strobe of a camera is flashed immediately above the display side of a liquid-crystal panel, if the light interceptive tape is larger by 0.5 mm or more than each IC, the light interceptive tape proves effective. When the strobe is flashed at an angle 45° with respect to the display side of a liquid-crystal panel, if the light interceptive tape is larger by 0.7 mm or more, the light interceptive tape proves effective.

According to the results of the experiment, as apparent from the table in FIG. 10A, sample A is markedly advantageous. The black tape of sample B allows light (flashlight) coming from front to travel. Sample B is therefore inferior to sample A. In this case, as the thickness of the light interceptive tape increases, the light interceptive tape becomes more effective. However, the thickness is limited because a too thick light interceptive tape becomes an obstruction in assembling components into a module.

As apparent from the table shown in FIG. 10B, since flashlight falls obliquely, a majority of light travels inside a liquid-crystal display device. As for light traveling inside the glass of the liquid-crystal display device, it can be absorbed by coloring a light interceptive tape in black. There is therefore substantially no difference between sample A and sample B.

As apparent from the tables shown in FIGS. 10C and 10D, when a light interceptive tape is larger by 0.7 mm or more than each IC, the light interceptive tape exerts an outstanding effect.

According to the present invention, a light interceptive member is placed on a side of a glass substrate opposite to bumps of ICs, and a light interceptive member made of silicon resin or the like is additionally placed over the ICs. It can therefore be prevented that light travels inside the transparent glass substrate and falls on the bump sides of the ICs. Moreover, the present invention has the advantages that light can be hindered from directly entering the bump sides of the ICs and that a liquid-crystal display device of high display quality can be provided with a cause of malfunction of ICs eliminated.

INDUSTRIAL APPLICABILITY

According to the present invention, it can be prevented that ICs serving as drive circuits and lying near a liquid-crystal display device malfunction due to extraneous light or internal traveling light, and display quality can be improved. The present invention will prove very helpful in various application fields in which liquid-crystal display devices are employed, such as, fields of liquid-crystal televisions, liquid-crystal monitors, and liquid-crystal projectors. The industrial applicability is therefore very high.

We claim:

1. A liquid-crystal display device in which at least two transparent glass substrates each having transparent electrodes formed thereon are arranged so that the transparent electrodes formed on the substrates are opposed to each other with a space between them, a liquid crystal is injected into said space, a seal is fitted into said space for fear said liquid crystal should leak out, and drive circuits for driving said liquid crystal are arranged on said substrates outside said seal, characterized in that:

a second light interceptive member having a light reflective member for reflecting light as one side thereof and having a light absorptive member for absorbing light as the other side thereof is placed on said transparent glass substrates below said drive circuits.

2. A liquid-crystal display device according to claim 1, wherein said light absorptive member is made of black nonwoven fabric.

3. A liquid-crystal display device according to claim 1, wherein said light absorptive member is made of black polyester cloth.

4. A liquid-crystal display device according to any one of claims 1 to 3, wherein a viscous material is coated over the face of said light absorptive member.

5. A liquid-crystal display device according to claim 4, wherein said viscous material is a rubber material, silicon material, or resin material.

6. A liquid-crystal display device according to claim 1, wherein said light reflective member is made of aluminum foil.

7. A liquid-crystal display device according to claim 1, further comprising a third light interceptive member for covering said drive circuits and their surroundings.

8. A liquid-crystal display device according to claim 7, wherein said third light interceptive member is made of silicon resin.

9. A liquid-crystal display device according to claim 7, wherein said third light interceptive member is made of the same material as said second light interceptive material.

10. A liquid-crystal display device according to claim 1, further comprising a fourth light interceptive member interposed between a frame having a display window and a side of a transparent glass substrate, on which drive circuits are mounted, in the vicinity of drive circuits.

11. A liquid-crystal display device according to claim 10, wherein said fourth light interceptive member is made of an elastic material such as sponge or rubber.

12. A liquid-crystal display device according to claim 1, wherein a fifth light interceptive member is placed to abut on a lateral side of a drive circuit, a transparent glass substrate, and a frame having a display widow.

13. A liquid-crystal display device according to claim 12, wherein said fifth light interceptive member is made of an elastic material such as sponge or rubber.

14. A liquid-crystal display device according to claim 1, a sixth light interceptive member is placed to abut on an edge of said second light interceptive member, a transparent glass substrate, and a frame having a display window.

15. A liquid-crystal display device according to claim 14, wherein said sixth light interceptive member is made of an elastic material such as sponge or rubber.

* * * * *